US007526351B2

(12) United States Patent
He et al.

(10) Patent No.: US 7,526,351 B2
(45) Date of Patent: Apr. 28, 2009

(54) VARIABLE SPEED PLAYBACK OF DIGITAL AUDIO

(75) Inventors: Li-wei He, Redmond, WA (US); Dinei A. Florencio, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 639 days.

(21) Appl. No.: 11/143,022

(22) Filed: Jun. 1, 2005

(65) Prior Publication Data

US 2006/0277052 A1 Dec. 7, 2006

(51) Int. Cl.
*G06F 17/00* (2006.01)

(52) U.S. Cl. ........................................................ 700/94

(58) Field of Classification Search ................... 700/94; 704/500–504; 381/61; 386/6, 68

See application file for complete search history.

(56) References Cited

U.S. PATENT DOCUMENTS

2003/0105539 A1 6/2003 Chang

OTHER PUBLICATIONS

Roucos, S. and Wilgus, A.M., "High-quality time-scale modifications for speech", in *IEEE Proceedings of the International Conference on Acoustics, Speech, and Signal Processing*, pp. 493-496 (1985).

European Search Report, Application No. PCT/US2006/16610 completed May 23, 2007, received Jun. 20, 2007.

*Primary Examiner*—Curtis Kuntz
*Assistant Examiner*—Andrew C Flanders
(74) *Attorney, Agent, or Firm*—Lyon & Harr, L.L.P.; Craig S. Fischer

(57) ABSTRACT

A method and system for modifying a digital audio signal to vary its playback speed while preserving the signal's pitch and quality. The variable speed playback (VSP) system and method mitigates artifacts remaining after processing by existing techniques. The VSP system and method produces a consistent and pleasing sound to an audio file, even while its speed is varied during playback. The VSP method includes selecting and estimating an input frame, adjusting the frame position, and overlapping and adding the adjust frame to an output signal. The frame position adjustment is achieved using an enhanced correlation technique that finds all local maxima over a cross-correlation function. The local maxima having a highest correlation score is designated as a cut position, where the adjusted frame is cut from the input buffer. The VSP system and method using four input frames to generate one output frame.

18 Claims, 9 Drawing Sheets

VARIABLE SPEED PLAYBACK OF DIGITAL AUDIO

BACKGROUND

Digital multimedia content is pervasive for both entertainment and work purposes. For entertainment and personal use, the proliferation of the Internet makes it possible for users to easily download digital music or music video from the Internet and play them on their personal computers. For work use, many corporations have their internal training videos and other work-related content available on Intranets. Thus, the volume of content available to a user is tremendous.

The volume of content can be at times overwhelming to a user. Often, the user will desire to consume the content at a speed different from that speed at which the content was created. As an analogy, a person may read text at different rates depending on the situation. For example, when reading a deep technical article, the reading rate typically is slower than if the person is merely skimming a magazine. Moreover, reading rates differ between people.

Just as text is read at different reading rates, it is desirable to provide a user with the ability to vary the playback speed of a digital audio signal. In other words, a user can have the ability to speed-up or slow-down audio content based on her preferences. For example, it is desirable for a user to be able to slow down the playback speed of a digital audio signal if he is trying to transcribe the lyrics of a song or take notes of a training video. Or, a user may want to speed up the slow sections of a presentation.

One of the simplest techniques for achieving variable speed playback is to play the audio signal at a different sampling rate from the rate it is captured. For example, an audio signal that was sampled at 16K Hz sampled signal and played back at 32K Hz achieves a factor of two (2×) speed up. One problem with this technique, however, it that audio pitch of the signal is distorted. A chipmunk-like effect is created when speeding up the signal, due to the increased pitch of the audio. Conversely, the pitch is lowered when slowing down the audio signal.

An improvement on the above technique is pitch-invariant variable speed playback. Pitch-invariant variable speed audio playback techniques change the playback speed of audio content without causing the pitch to change. The most basic of such techniques take short audio frames, discard a portion of the frames, and connect the remaining frames. A frame is a group of consecutive audio samples of fixed length (such as 100 ms). A portion of the frames are discarded, for example, dropping 33 ms of a frame to get 1.5× compression. The remaining samples then are abutted. One problem with these pitch-invariant variable speed audio playback techniques is that they produce artifacts (such as audible "clicks") and other forms of signal distortion. These artifacts and signal distortions are caused by discontinuities at the interval boundaries produced by discarding samples and abutting the remnants.

Instead of abutted, a technique called Overlap Add (OLA) uses an overlapped region at the junctions of the two frames and applies a windowing function or smoothing filter (such as a cross-fade) to the transition. OLA largely eliminates clicks in the output signal, but sometimes reverberations still can be heard.

An improvement to the OLA technique is the Synchronized OLA (SOLA) technique. The SOLA technique includes shifting the beginning of a new audio frame over the end of the preceding frame to find the point of highest waveform similarity. This is achieved by a cross-correlation computation. Once this point is found, the frames are overlapped, as in OLA technique. The SOLA technique provides a locally optimal match between successive frames and mitigates the reverberations sometimes introduced by the OLA technique. Nevertheless, some artifacts still are noticeable when using the SOLA technique, especially at larger playback speed variation.

SUMMARY

The invention includes a variable speed playback (VSP) system and method that varies the playback speed of a digital audio signal having an original playback speed. The VSP system and method contains several improvements to mitigate some artifacts still existing in the SOLA technique. The VSP system and method uses a similar framework as the SOLA technique, namely, take a sequence of fixed-length short audio frames from the input, overlap and add them to produce the output. However, the VSP system and method contain several improvements over the SOLA technique. In particular, the SOLA technique uses a frame length of 30 ms, where overlapping regions of an input frame are 15 ms. In addition, for each output sample there is a maximum of two input samples involved. This means that the number of input frames needed to generate one output frame (or the input-to-output ratio) is 2:1. On the other hand, the VSP system and method can use a 20 ms frame length. In addition, for each output sample there are at least four input samples involved, such that the input-to-output ratio is at least 4:1. Input frames are picked at a much higher frequency (also known as oversampling). The more frequently the input frame is sampled, the better fidelity is achieved, especially for music. This is because there is a great deal of dynamics and pitches in many types of music, especially symphonies, such that there is not a single pitch period. Thus, estimating a pitch period is not easy. To alleviate this difficulty, the VSP system and method oversamples.

The VSP method includes receiving an input audio signal (or audio content) containing a plurality of samples or packets. The VSP method processes the samples as they are received. There is no need to have the entire audio file to begin processing. These packets could come from a file or from the Internet. Once the packets arrive, they are appended to the end of an input buffer. Once they are in the input buffer, the packets lose their original boundary. The packet size is irrelevant, because in the input buffer there are a continuous number of samples.

Initialization occurs by the obtaining the first frame of the output buffer. For the first frame, the first 20 ms is copied from the input buffer to the output buffer. After initialization, an input frame is selected. This selection is based on the desired speed-up factor. In a preferred embodiment, the frame length is fixed at 20 ms. Alternatively, the frame length can be a length that is particular to certain content. For example, there may be some optimal value for a particular piece of music. The frame length is dependent on the content, and cannot be an arbitrary value. There is a moving search window within the input samples in the input buffer that is used to select the input frames. The VSP system and method also includes an output buffer. If there are N samples in the input buffer, and the user has specified a playback speed of S, and the normal playback speed is 1.0, then the output buffer should have N/S number of samples. If S=1.0, then the input and output buffers will have the same number of samples. The input is a train of samples, and a frame is a fixed-length sliding window from the train of samples. A frame is specified by specifying a starting sample number, starting from zero. There is also a train of samples in the output buffer. After each new frame is overlapped with the signal in the output buffer, the output buffer point $O_b$ is incremented by 5 ms. Then, the input buffer point initial estimate is set to $O_b$ multiplied by S. This is where the candidate for the subsequent frame is generated.

By way of example, as soon as enough packets arrive in the input buffer for 20 ms of content, this 20 ms of content is copied to the output buffer. Then, $O_b$ is moved or incremented by 5 ms. This is because it is desired to overlap 4 frames together. Further assume the speedup factor is 2×(S=2). To get the $2^{nd}$ frame, the formula $O_b$*S=5 ms*2=10 ms is used. This means that an estimated center (or offset position) of the $2^{nd}$ candidate frame is at 10 ms in the input buffer. But if the input does not have 30 ms of samples, the VSP system and method must wait until 30 ms of packets have arrived before generating the $2^{nd}$ frame. However, there is also a search window having a 30 ms window size, so in reality there must be 60 ms of content before the $2^{nd}$ frame can be output. If a file is the input, then this is not a problem, but if it is streaming audio, then the VSP system and method must wait for the packets to arrive.

The distance from 0 to $O_b$ in the input buffer is the number of samples that can be output. Although 20 ms of frame length is generated for a first frame during initialization, only 5 ms of the first frame can be copied from the input to the output buffer. This is because the remaining 15 ms may need to be summed with the other three frames. The portion of the frame from 5 ms to 10 ms is waiting for a part of the $2^{nd}$ frame, the portion of the frame from 10 ms to 15 ms is waiting for the $2^{nd}$ and $3^{rd}$ frames, and the portion of the frame from 15 ms to 20 ms is waiting for the $2^{nd}$, $3^{rd}$ and $4^{th}$ frames. After each new frame is overlapped and added to the output buffer, $O_b$ is moved or incremented by the number of completed samples (such as 5 ms in one embodiment). In addition, in one embodiment, a Hamming window is used to overlap and add. The output buffer contains the frames added together.

After a frame is selected, a refinement process is used to adjust the frame position. The goal is to find the regions with the search window that will be best matched in the overlapping regions. In other words, find a starting point for the adjusted input frame that best matches with the tail end of the output signal in the output buffer. The adjustment of the frame position is achieved using a novel enhanced correlation technique. This technique defines a cross-correlation function between each sample in the overlapping regions of the input frame that are in the search window, and the tail end of the output signal. All local maxima in the overlapped regions are considered. Existing techniques such as SOLA and OLA used cross-correlation to find only a maximum of a function to obtain the best match. Although this is the highest point, it may not be the true pitch period.

This novel cross-correlation technique performs the cross correlation and finds the local maxima. The enhanced correlation technique finds local maxima, multiplies each local maxima found by weighting function, and selects the local maxima having the highest weight. This technique gives better prediction of pitch period than prior art techniques. This technique also sounds better, giving a more continuous-sounding signal. Given a function, the output is weighted, such that local maxima that are closer to the center of the search window are favored and given more weight. In some embodiments, the weighting function is a "hat" function. The slope of the weighting function is some parameter that can be tuned. The input function is multiplied by the hat weighting function. In a preferred embodiment, the top of the hat is 1 and the ends of the hat are ½. At + and −WS (where WS is the search window), the weighting function=½. The hat function weights the contribution by its distance from the center. The center of the "hat" is the offset position.

The adjusted frame then is overlapped and added to the output signal in the output buffer. Once the offset is obtained, another frame sample is taken from the input buffer, the adjustment is performed again, and an overlap-add is done in the output buffer.

The VSP system and method also includes multi-channel correlation technique. Typically, music is stereo (two channels) or 5.1 sound (six channels). In the stereo case, the left and right channels are different. The VSP system and method then averages the left and right channels. The averaging occurs on the incoming signals. In order to compute the correlation function, the averaging is performed. But the input and output buffers are in still stereo. Incoming packets are stereo packets. They are appended to the input buffer, and each sample contains two channels (left and right). When a frame is selected, the samples containing the left and right channels are selected. When the cross-correlation is performed, the stereo is collapsed to mono. The offset position is found, and then the samples of the input buffer are copied, where the samples still have left and right channels. Then the samples are overlapped to the output buffer. This means that the left channel is always mixed with left channel and right channel is always overlapped and added to the right channel. In the 5.1 audio case, only the first two channels are used in producing the average for correlation, in the same manner as in the stereo case.

The VSP system and method also includes hierarchical cross-correlation technique. This technique is needed sometimes because the enhance cross-correlation technique discussed above is a central processing unit (CPU) intensive operation. The cross-correlation costs are of the order of nlog(n) operations. Because the sampling rate is so high, and to reduce CPU usage, the hierarchical cross-correlation technique forms sub-samples. This means the signals are converted into a lower sampling rate before the signals are fed to the enhanced cross-correlation technique. This reduces the sampling rate so that it does not exceed a CPU limit. The VSP system and method performs successive sub-sampling until the sampling rate is below a certain threshold. Sub-sampling is performed by cutting the sampling rate in half every time. Once the sampling rate is below the threshold, the signal is fed into the enhanced cross-correlation technique. The offset then is known, and using the offset the samples can be obtain from the input buffer and put into the output buffer. Another enhanced cross-correlation is performed, another offset found, and the two offsets are added to each other.

The VSP system and method also includes high-speed skimming of audio content. The playback speed of the VSP system and method can range from 0.5× to 16×. When the playback speed ranges from 2× to 16×, each frame becomes too far apart. If the input audio is speech, for example, many words are skipped. In high-speed skimming, frames are selected and then in the chosen frames they are compressed up to two times. The rest are thrown away. Some words will be dropped while skimming at high speed, but at least the user will hear whole words rather the word fragments.

The preceding Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWING DESCRIPTION

Referring now to the drawings in which like reference numbers represent corresponding parts throughout:

DETAILED DESCRIPTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the invention.

I. Introduction

Existing variable speed playback techniques (such as OLA and SOLA) have a number of drawbacks. One drawback is that only the maximum point in a cross-correlation measurement is used to find the best matching point to do an overlapping operation. However, the position that indicates the true and optimal pitch period might not be the one that maximum measure. Another drawback of existing techniques is that the overlap is half of the frame length (such as 10 ms with a 20 ms frame length). This means that at most two frames are overlapped. However, this approach produces an audio signal that sounds broken down at playback speed less 0.7× original playback speed or greater than 1.75× playback speed.

The VSP system and method overcomes these and other drawbacks of current variable speed playback techniques to mitigate artifacts remaining after processing by these existing techniques. This produces a consistent and pleasing sound to an audio file, even while its speed is varied during playback. In particular, the VSP system and method find all local maxima of a cross-correlation function, and then applies a weighting function to weight each samples contributions by their distances to an offset position in the input buffer. The closer a local maxima is to the offset position, the greater weight and the higher a correlation score. The local maximum having the highest weighted value (i.e., highest correlation score) is chosen as the position to copy from the input. The VSP system and method also uses an overlap factor of 75% of the frame length. This means that each output frame of the output signal is the result of four overlapped input frames. This allows a digital audio signal to be played back faster or slower than its original playback speed without any pitch change and without troublesome artifacts.

II. General Overview

Figure 1:
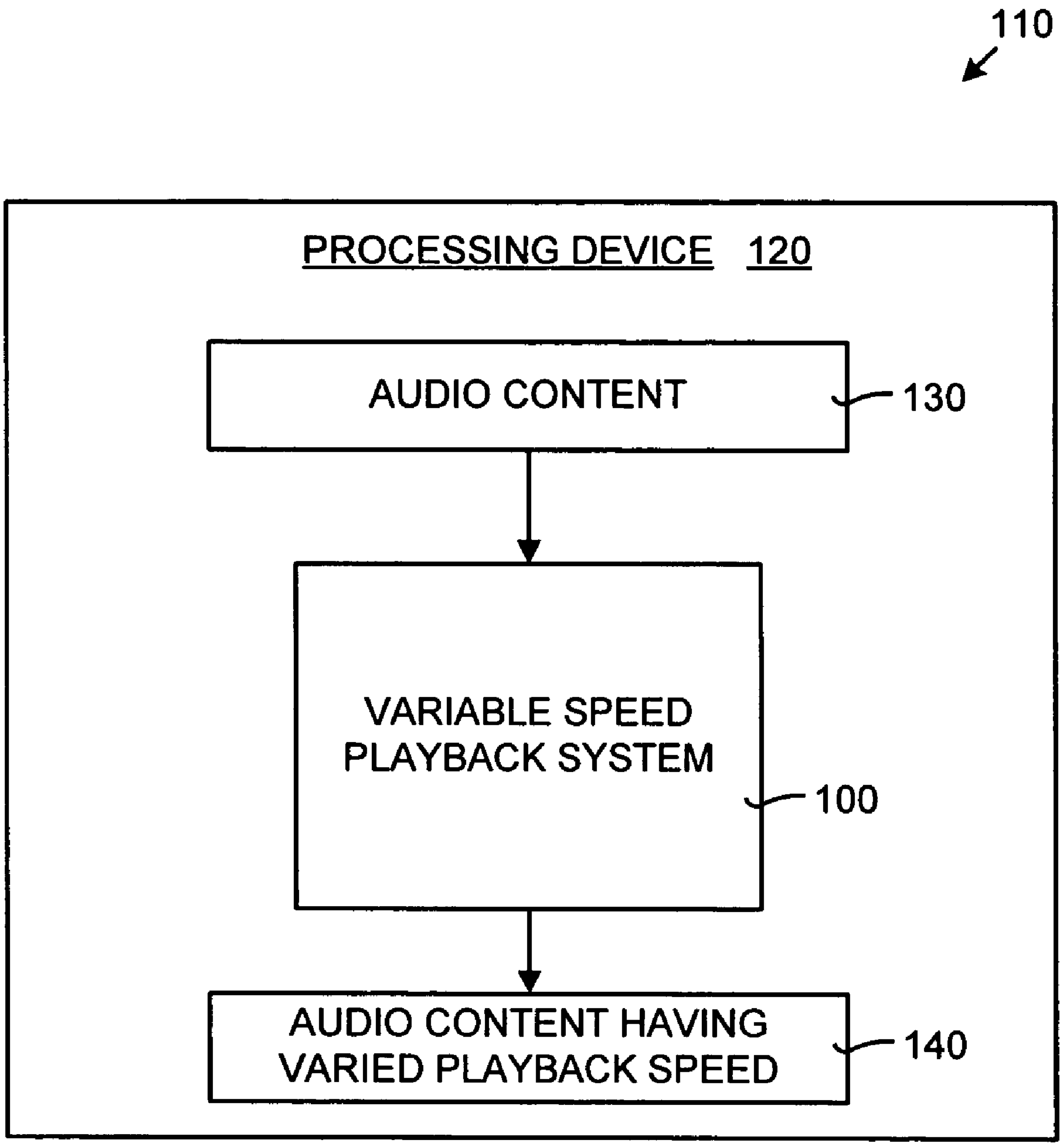
FIG. 1 is a block diagram illustrating an exemplary implementation of the variable speed playback (VSP) system and method.

FIG. 1 is a block diagram illustrating an exemplary implementation of the variable speed playback (VSP) system and method. It should be noted that FIG. 1 is merely one of several ways in which the VSP system and method may implemented and used.

Referring to FIG. 1, in this exemplary implementation a variable speed playback (VSP) system 100 is shown in a computing environment 110. The computing environment includes a processing device 120 that provides the processing power for the VSP system 100.

The VSP system 100 inputs audio content 130. The audio content 130 is a digital audio signal whose source can be from an audio file, streaming audio or any other type of digital audio source. Whatever the source, the audio content 130 received by the VSP system 100 is at an original playback speed (typically a normal real-time playback speed). The incoming audio content 130 is processed by the VSP system 100 using the processing device to obtain audio content having a varied playback speed 140. This means that the audio content 130 is played back at slower or faster than the original playback speed. For example, after processing by the VSP system 100, the audio content 130 may have a playback speed of slower or faster than the original playback speed. In one of the preferred embodiments, the VSP system 100 allows playback of the audio content 130 ranging from as low as half speed (0.5×) and as fast as sixteen times faster than normal speed (16×).

III. System Components

Figure 2:
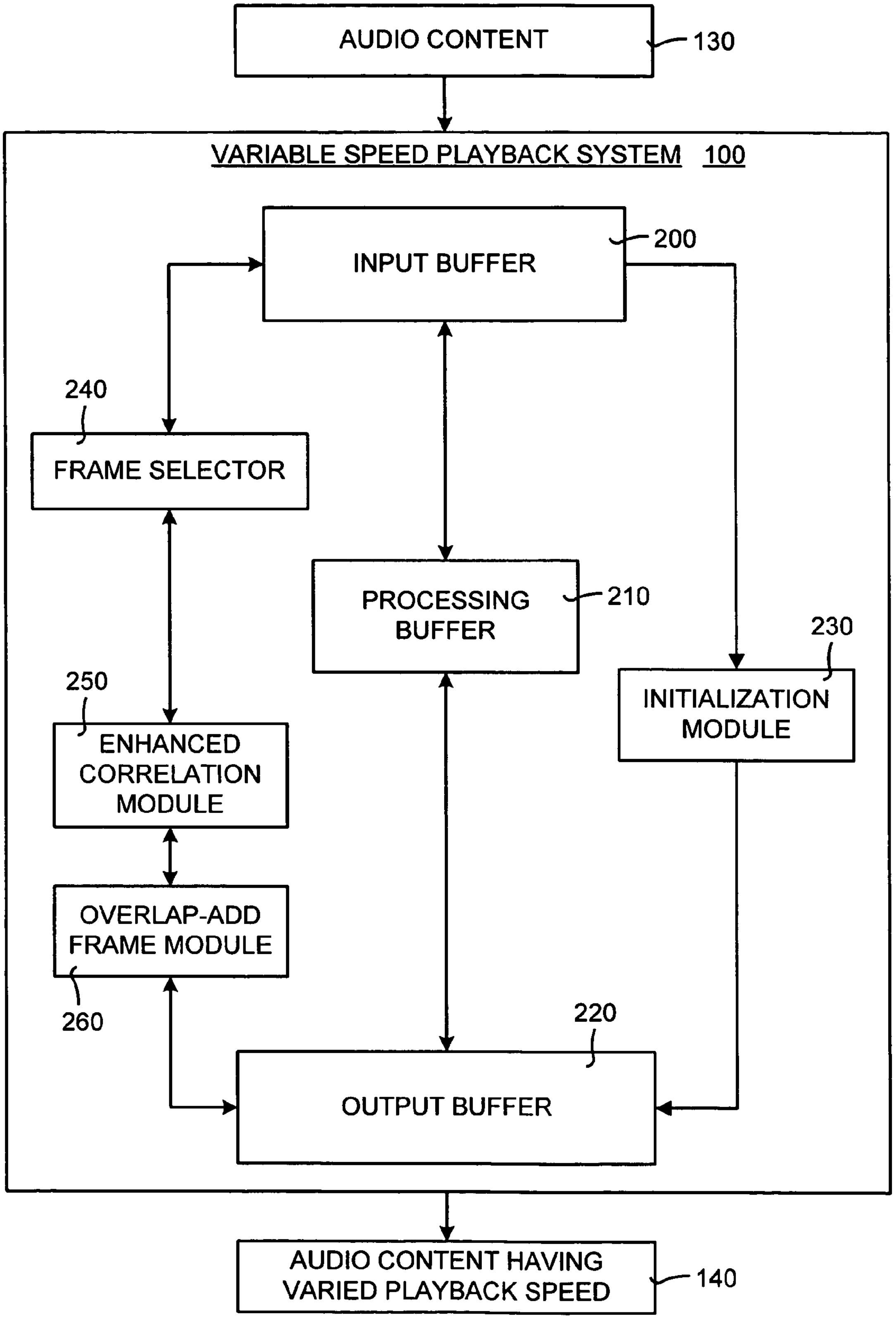
FIG. 2 is a block diagram of an exemplary implementation of the VSP system shown in FIG. 1.

The VSP system 100 may be implemented as a software filter that is chained together with other filters in an audio processing pipeline. FIG. 2 is a block diagram of an exemplary implementation of the VSP system 100 shown in FIG. 1. The input of the VSP system 100 is the audio content 130. The input audio content 130 can be a sequence of uncompressed audio frames (such as in Pulse Code Modulation format at 500 ms each). The audio content 130 can be in any sampling rate or have any number of channels. The audio content 130 includes input audio samples that are delivered from the upstream filters in the audio processing pipeline to the VSP system 100.

The VSP system 100 accumulates the incoming samples in an input buffer 200, generates input frames, and processes the input frames in a processing buffer 210. The processed input frames are used to generate output frames, which are part of an output signal. The output signal is generated in an output buffer 220. The output buffer 220 notifies any downstream filters in the audio pipeline when it is ready to output a frame. The output frames may not necessarily have the same frame length as the input frame.

The goal of the VSP system 100 is to produce approximately N/S samples as output from every N input samples at a given playback speed of S. Usually, the output samples are in the same sampling rate and have the same number of channels. The VSP system 100 and method embodied thereon can be run either in a real time or an off-line manner. In the real time case, the input frames arrive at the same rate of its frame length (such as every 500 ms if the frame length is 500 ms). The output frames generated have to adhere to the same restriction. In the offline case, there is no such restriction.

The VSP system 100 includes an initialization module 230, a frames selector 240, an enhanced correlation module 250, and an overlap-add frame module 260. The operation of the each of these modules is discussed in detail below. In general, however, the initialization module 230 initializes the output signal by copying a first frame length of audio content from the input buffer 200 to the output buffer 220. This yields an initial portion of the output signal.

Subsequent content for the output signal is generated using the frame selector 240. The frame selector 240 estimates an offset or center location in the input buffer and centers a search window at this offset location. The search window is a moving window within the input buffer 200. The offset location is a location offset a distance from the beginning of the input buffer. The initial selection of a frame from the input buffer 200 is the frame centered in the search window.

The enhanced correlation module 250 processes the selected frame in the processing buffer 210. The module 250 uses an enhanced correlation technique to adjust the location of the selected frame within the search window. This is achieved by defining a cross-correlation function and finding all local maxima in the function. The cross-correlation function defines a correlation between each sample of the selected frame within the search window and an end of the output signal in the output buffer 220. Further, only samples in the search window that lay within overlapping regions are examined. Overlapping regions means those portions of the selected frame that overlap with other frames.

A weighting function then is applied to each of the local maxima, and the local maximum having the highest correlation score is designated as the starting position for the adjusted frame (or the "cut" position). The adjusted frame is the selected from whose starting location has been adjusted to begin at the cut position. The frame length remains the same, only the starting location may varying between the initial frame selected and the adjust frame.

The overlap-add frame module 260 then cuts the adjusted frame from the input buffer 200 at the cut position and copies the adjust frame to the output buffer 220. The beginning location of the cut adjusted frame (at the cut position) is matched to the end of the output signal in the output buffer 220. In this manner, content is added to the output signal.

The output of the VSP system 100 is the output signal that contains audio content having a varied playback speed 140. In other words, the output signal has a playback speed that differs from the original playback speed of the input audio content 130. The varied playback speed may be faster or slower that the original playback speed of the input audio content 130.

It should be noted that FIG. 2 represents the processing flow of the VSP system and method. A single arrow head indicates that the processing flows in a single direction, while double arrowheads means that the processing flow may occur in either direction. By way of example, the input, processing and output buffers all can share data and information between themselves, as indicated by the double arrow heads. However, the input buffer sends information and data to the initialization module but typically does not receive information from that module, as indicated by the single arrow head.

IV. Operational Overview

Figure 3:
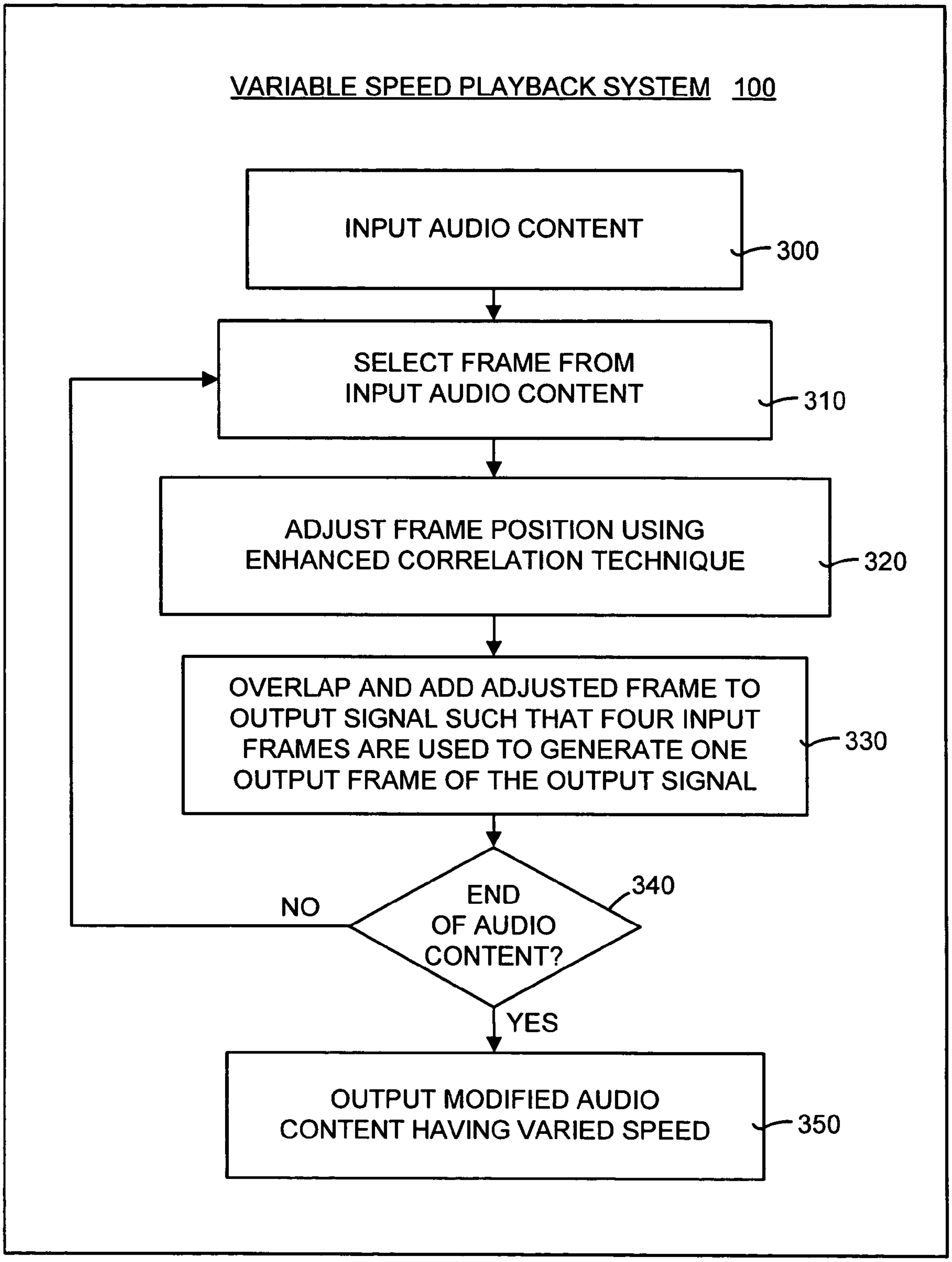
FIG. 3 is a general flow diagram illustrating the general operation of the VSP system.

Embodied on the VSP system 100 shown in FIGS. 1 and 2 is a VSP method and process. The operation of the method and process now will be discussed. FIG. 3 is a general flow diagram illustrating the general operation of the VSP system 100. In general, the VSP method processes an input digital audio signal having an original playback speed such that the original playback speed is altered. This alteration may be to slow down or speed up the original playback speed. The processing performed by the VSP method is done is such a manner as to preserve the quality and pitch of the original digital audio signal.

The VSP method begins by receiving input audio content (box 300). The audio content is a digital audio signal having an original playback speed. The audio content is received and placed in the input buffer 200. A data filter is used to filter arriving packets of audio content. These packets may come from an audio file stored locally or be streaming audio from the Internet. Once the packets arrive, they are appended to the end of the input buffer 200. Once in the input buffer the packets lose their original boundaries. The packet size is irrelevant, because in the input buffer there are a continuous number of samples.

Next, a frame is selected from the input audio content (box 310). A frame is contiguous block, group or collection of digital samples. For example, if the sampling rate is 16 MHz, then a frame having a frame size of 20 ms contains 320 samples. In one of the preferred embodiments, the frame length is fixed at 20 ms. Alternatively, the frame length can be a length that is particular to certain content. For example, there may be some optimal value for audio content containing a particular piece of music. The frame length is dependent on the content, and is not an arbitrary value.

The selected frame then undergoes an adjustment to refine its boundaries (box 320). This adjustment is performed using a novel enhanced correlation technique, described in detail below. In general, the enhanced correlation technique determines an optimal starting position for the selected frame by correlating the end of the output signal in the output buffer 220 with the overlapping regions of the selected frame within a search window. The optimal starting position is also known as the "cut position", since this is the position of the audio signal in the input buffer 200 where a cut is made, marking the beginning of the selected frame. The enhanced correlation technique obtain the optimal starting position by finding a plurality of local maxima in the overlapped regions of the search window and applying a weighting function to each of the local maxima to obtain a correlation score. The local maximum having the highest correlation score is designated as the optimal starting position for the selected frame.

Once the optimal starting position (or cut position) is determined, the VSP method overlaps and adds the adjusted frame to the output signal (box 330). This is achieved by pasting the optimal starting position of the adjusted frame to the end of the output signal. This overlap and add operation is performed a plurality of times such that four input frames of the input signal are used to generated one output frame of the output signal. For example, if the frame size is 20 ms, then each input frame generates approximately 5ms of output signal, such that four input frames generate an entire 20 ms output frame. This means that the overlap factor equal 75% of the frame length such that each output frame is the result of four overlapped input frames.

A determination then is made as to whether the end of the audio content has been reached (box 340). If not, then another frame is selected from the audio content in the input buffer 200 and the entire process is performed again to obtain additional content for the output signal. Otherwise, if the end of the audio content has been reached, the contents of the output buffer 220 are output (box 350). The output signal contains modified audio content having a varied speed, in other words, a playback speed that is different from the original playback speed of the input audio content.

V. Operational Details

The details of the operation of the VSP system and method shown in FIGS. 1-3 now will be discussed. In order to more fully understand the VSP system and method disclosed herein, operational details of exemplary embodiments are presented. However, it should be noted that these exemplary embodiments are only some of many ways in which the VSP system and method may be implemented and used.

Figure 4:
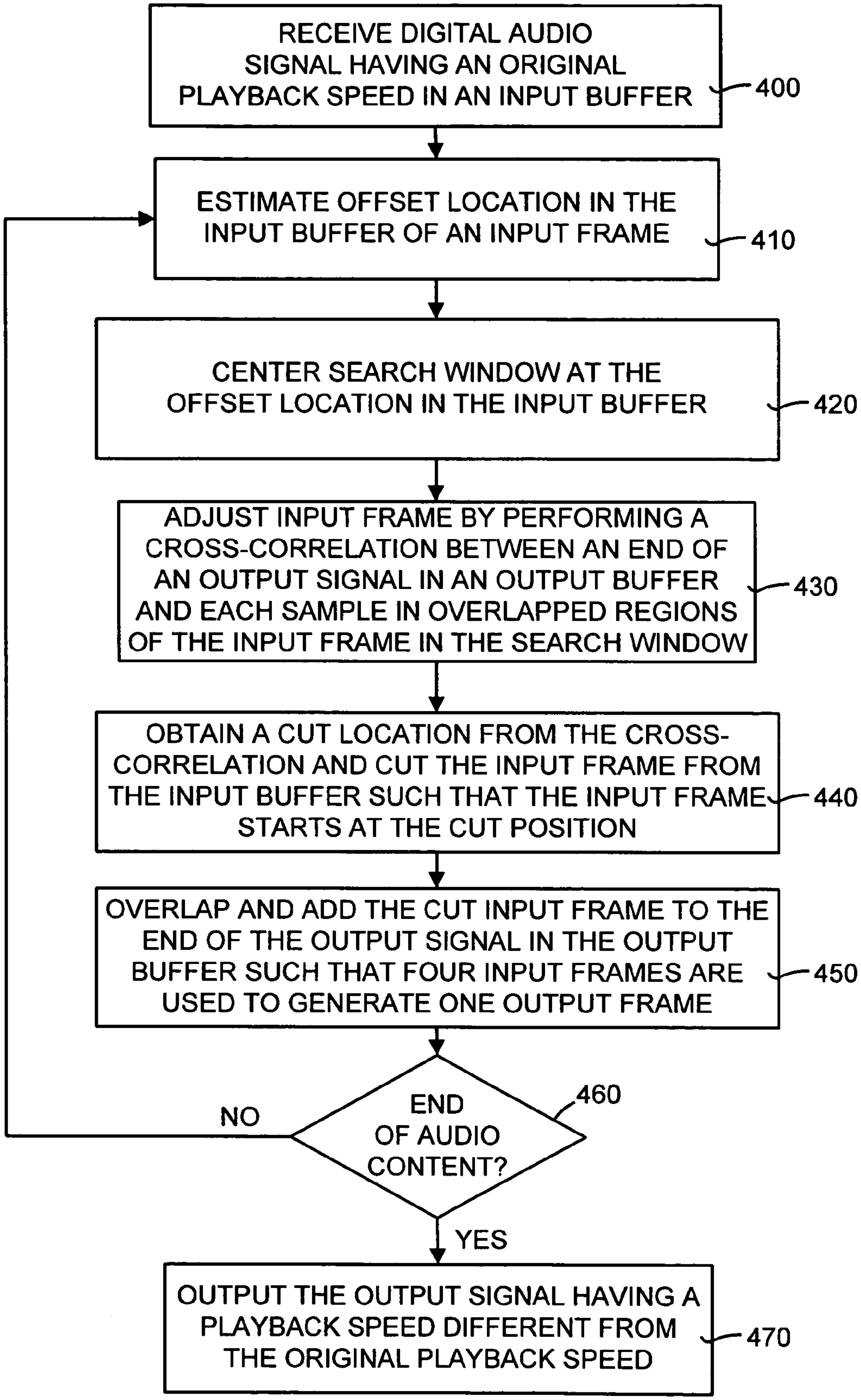
FIG. 4 is a detailed flow diagram illustrating a more detailed operation of the VSP method shown in FIG. 3.

FIG. 4 is a detailed flow diagram illustrating a more detailed operation of the VSP method shown in FIG. 3. The VSP method receives, in the input buffer, a digital audio signal having an original playback speed (box 400). The offset location of an input frame in the input buffer then is estimated (box 410). The search window is centered in the input buffer at this offset location (box 420).

The selected frame that is within the search window then is adjusted (box 430). This frame adjustment is achieved by performing a cross-correlation between an end of the output signal in the output buffer and each sample in overlapped regions of the input frame in the search window. From this cross-correlation, a cut position is obtained, and a cut of the input frame is made in the input buffer such that the input frame starts at the cut position (box 440). The cut frame is overlapped and added to the end of the output signal in the output buffer (box 450). This entire process is performed such that at least four input frames are used to generate one output frame of the output signal. A determination then is made as to whether there is any more audio content in the input buffer (box 460). If so, then another input frame is selected by starting the process again at the estimate offset location in the input buffer of an input frame (box 410). Otherwise, the output signal is an output, where the output signal has a playback speed that is different from the original playback speed (box 470). It should be noted that the entire output signal does not need to output as once. In alternate embodiments, output frames of the output signal can be output as needed or desired.

Figure 5:
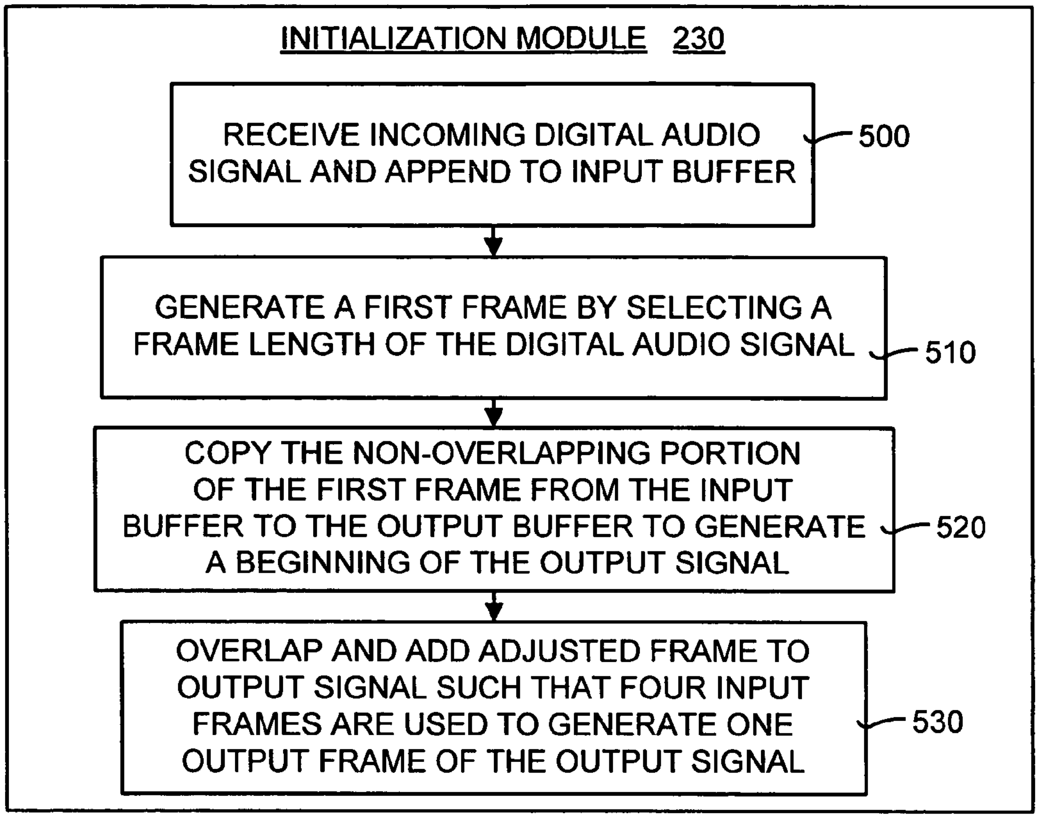
FIG. 5 is a detailed block/flow diagram of the operation of the initialization module shown in FIG. 2.

FIG. 5 is a detailed block/flow diagram of the operation of the initialization module 230 shown in FIG. 2. In general, the initialization module 230 provides a starting frame (or portion thereof) of the output signal in the output buffer. Specifically, referring to FIG. 5, the initialization module 230 receives an incoming digital audio signal containing samples and appends the samples to the input buffer (box 500). Next, the first frame (or portion thereof) is generated by selecting a frame length of the digital audio signal (box 510).

A copy of the non-overlapping portion of the first frame from the input buffer is placed in the output buffer (box 520). This generates the beginning portion of the output signal in the output buffer. Next, the adjusted frame is overlapped and added to the output signal such that four input frames are used to generate a single output frame (box 530).

Figure 6:
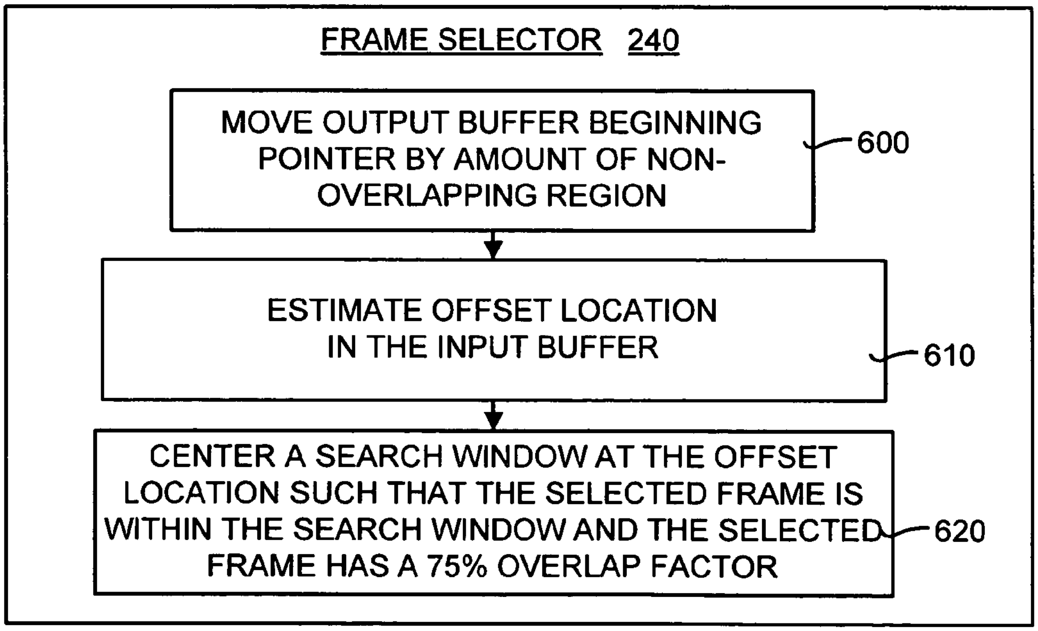
FIG. 6 is a detailed block/flow diagram of the operation of the frame selector shown in FIG. 2.

FIG. 6 is a detailed block/flow diagram of the operation of the frame selector 240 shown in FIG. 2. The frame selector 240 operation begins by moving an output buffer beginning pointer by an amount of the non-overlapping portion of the input frame (box 600). Next, the offset location in the input buffer is estimated to obtain a selected input frame (box 610). The search window then is centered at the offset location such that the selected frame is within the search window (box 620). The selected frame has a 75% overlap factor, meaning that ¾ of the frame is overlapped with the existing content of the buffer, and ¼ of the frame is non-overlapped.

Figure 7:
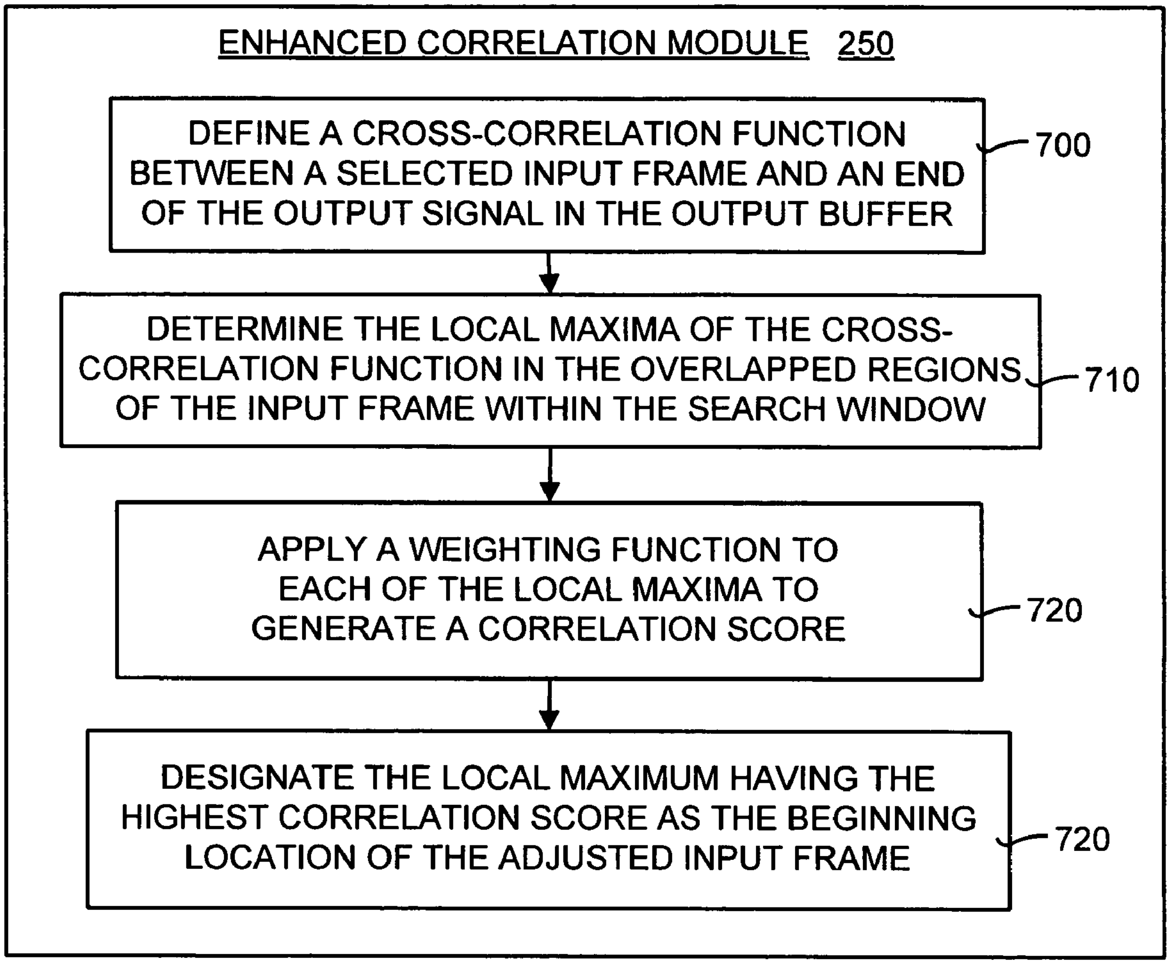
FIG. 7 is a detailed block/flow diagram of the operation of the enhanced correlation module shown in FIG. 2.

FIG. 7 is a detailed block/flow diagram of the operation of the enhanced correlation module 250 shown in FIG. 2. In general, the enhanced correlation module 250 performs a cross-correlation computation to find a locally optimal match between the beginning of cut input frame and the end of the output signal in the output buffer. More specifically, referring to FIG. 7, a cross-correlation function is defined between a selected input frame and the end of the output signal in the output buffer (box 700).

Next, the local maxima of the cross-correlation function are determined (box 710). These local maxima are determined in the overlapped regions of the input frame and that are within the search window. Once the local maxima are found, a weighting function is applied to each of them to generate a correlation score for each of the local maxima (box 720). The local maximum having the highest correlation score is designated as the cut position, or the beginning location of the adjusted input frame (box 730).

Figure 8:
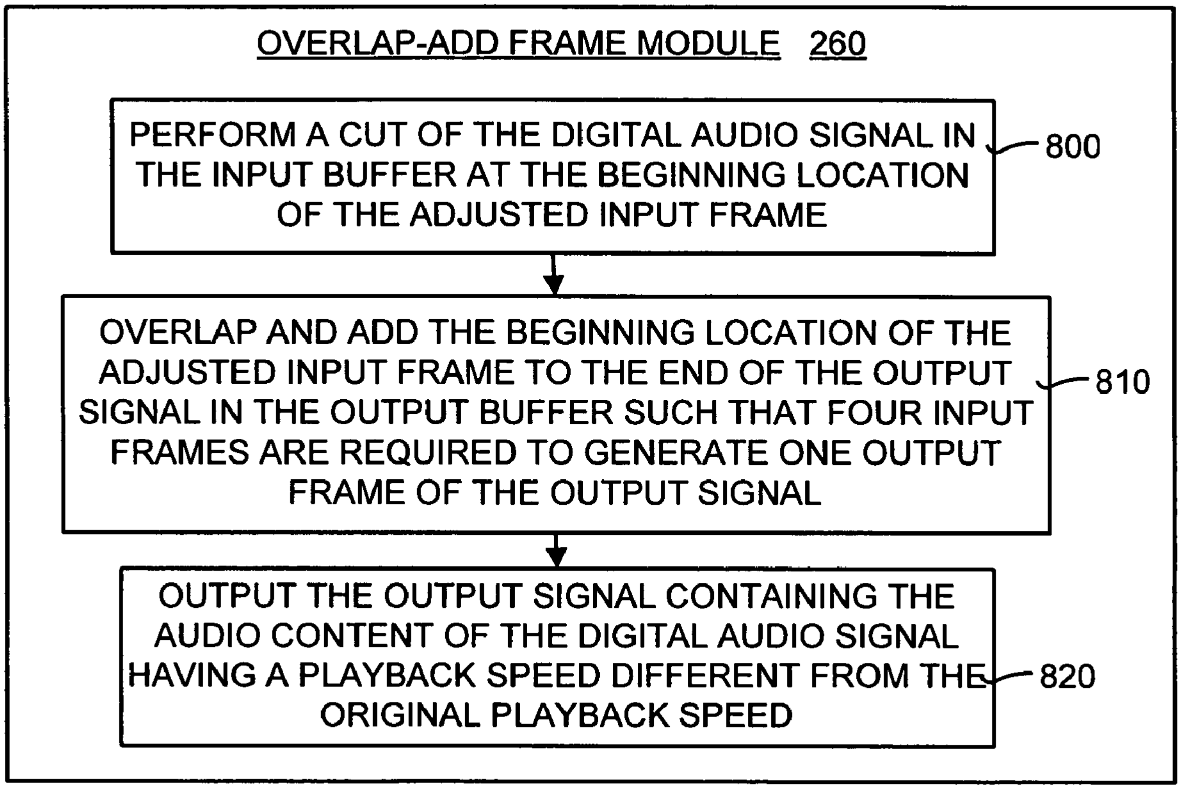
FIG. 8 is a detailed block/flow diagram of the operation of the overlap-add frame module shown in FIG. 2.

FIG. 8 is a detailed block/flow diagram of the operation of the overlap-add frame module 260 shown in FIG. 2. A cut is performed of the digital audio signal in the input buffer at the cut position (box 800). This cut position becomes the beginning location of the adjust frame. Next, the beginning location of the adjusted input frame is overlapped and added to the end of the output signal in the output buffer (box 810). This overlap and add is performed such that at least four input frames are used to produce one output frame of the output signal. The output signal is output from the overlap-add frame module (box 820). The output signal contains the same audio content of the input digital audio signal, but has a playback speed that differs from the original playback speed of the digital audio signal.

Figure 9:
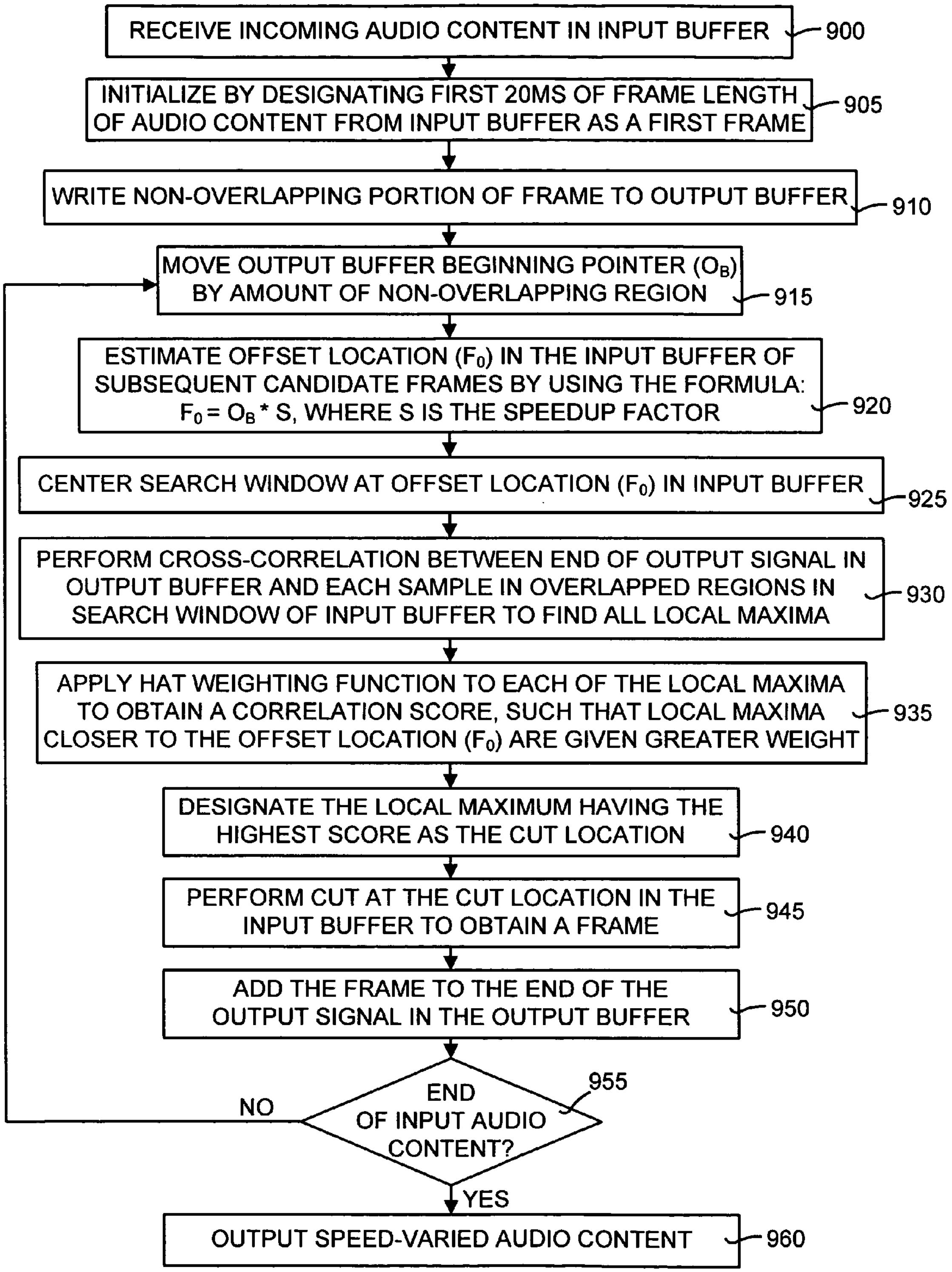
FIG. 9 is a detailed flow diagram illustrating the operational details of an exemplary embodiment of the VSP system and method.

FIG. 9 is a detailed flow diagram illustrating the operational details of an exemplary embodiment of the VSP system and method. This exemplary embodiment begins by receiving incoming audio content in the input buffer (box 900). The audio content contains a plurality of input samples. These input samples are appended to the end of the input buffer after arrival. Initialization occurs by designating the first 20 ms of frame length of audio content in the input buffer as a first frame (box 905). The non-overlapping portion of the first frame is written or copied to the output buffer (box 910).

The frame length used internally by the VSP system 100 can be different from the input frame length which is usually decided by system considerations. The internal frame length is decided based on audio signal property. In this exemplary implementation, a 20 ms internal frame length (FL) is used.

Both the input and output buffers contain a pointer to the beginning of the buffers and a pointer to the end of the buffers. The output buffer beginning point ($O_b$) is moved in the output buffer by an amount of the non-overlapping region (box 915). In this implementation, the non-overlapping region was 5 ms (or $O_b$=5 ms). An offset position ($F_0$) is estimated in the input buffer of subsequent candidate input frames by using the formula:

$$F_0=O_b*S,$$

where $F_0$ is the first sample of the chosen frame in the input buffer, $O_b$ is the pointer to the beginning of the output buffer, and S is the playback speed. The search window is centered at the offset position in the input buffer (box 925). If $F_0$+FL+Δ (where Δ is the neighborhood to search) exceeds the pointer to the end of the input buffer $I_e$, there is not enough input so no output is generated until addition audio content is received.

To mitigate reverberations sometimes introduced by other variable speed playback techniques, the VSO system and method disclosed herein adds an additional step of searching a neighborhood around the estimated next cut position to find a locally optimal waveform matching between the cut input frame and the end of the output buffer. This is accomplished by a cross-correlation computation. Once this cut position is found, the frame cut from the input can be overlapped and added to the end of the output buffer.

In existing variable speed playback technique, a standard normalized cross correlation measurement is used to find the best matching point to do the overlapping operation. A normalized cross correlation between the end of the output buffer (the template) and the input frame plus its neighborhood is used. The result is an array of similarity measure indexed by the position in the input buffer. In these existing techniques, the position that has the maximum similarity measure is chosen. However, the position that indicates the true pitch period might not be the one that maximum measure.

The VSP system and method first finds all local maxima in the similarity measure array, then weight their contributions by their distances to the offset position computed above. The closer a local maxima is to the offset position, the greater weight and the higher the correlation score. The local maximum having the highest weighted value (i.e., highest correlation score) is chosen as the position to copy from the input.

More specifically, referring to FIG. 9, the local maxima are found of a cross-correlation function between the end of the output signal in the output buffer and each sample in the overlapped portions in the search window of the input buffer (box 930). A hat weighting function is applied to each of the local maxima to obtain a correlation score (box 935). As stated above, local maxima that are closer to the offset position ($F_0$) are given greater weight than away from the offset position. The local maximum having the highest correlation score is designated as the cut position (box 940).

A cut is performed at the cut position in the input buffer to obtain an adjusted frame (box 945). The chosen frame then is copied from the input buffer and overlapped and added to the end of the output buffer (box 950). In some existing variable playback speed techniques, the overlap is half of the frame length (such as 10ms with a 20 ms frame length). In these existing systems, at most two frames are overlapped. However, this approach produces audio signal that sounds broken down at playback speed less 0.7× original playback speed or greater than 1.75× playback speed. The VSP method and system uses an overlap factor of 75% of the frame length. This means that each output frame of the output signal is the result of four overlapped input frames. A determination then is made as to whether there is additional audio content (box 955). If not, then the process begins again by first moving the output buffer beginning pointer ($O_b$) by an amount of the non-overlapping region (box 915). In this case, $O_b$=5ms. If the end of the audio content has been reached, then the playback speed varied audio content is output (box 960).

Multi-Channel Correlation

Unlike speech content, audio content that contains music often includes multiple channels of correlated signal. In existing variable playback speed techniques, the amount of shift for each frame in each channel is decided by the matching point found on the first channel (typically the left channel). For stereo audio content, the VSP system and method averages the signal from two channels and then searches for the matching point for the averaged signal. For 5.1 channel audio content, only the first two channels are used. After this matching point is found, each channel is shifted independently, but according to this distance.

Hierarchical Cross Correlation

The processing complexity for each correlation measurement increases in O(n*Log(n)) where n is the sampling rate. When processing high fidelity music at sampling rates up to 96 KHz, the central processing unit (CPU) load from the VSP system and method can exceed its quota. In order to reduce CPU usage while maintaining audio quality, the VSP system and method uses a hierarchical cross correlation. For audio content that exceeds a limit (such as 22 KHz), the following hierarchical cross correlation technique is used. First, the signal is successively sub-sampled by a factor of 2 until they are below the limit. It should be noted that low-pass filtering before this sub-sampling may be performed. Second, the enhanced correlation technique (described above) is performed on the sub-sampled signal. Third, after finding the optimal matching point, another enhanced correlation technique is performed on the original signal. In this case, the search window is limited to the sub-sample kernel.

VI. Exemplary Operating Environment

The VSP system and method are designed to operate in a computing environment and on a computing device. The computing environment in which the VSP system and method operates will now be discussed. The following discussion is intended to provide a brief, general description of a suitable computing environment in which the VSP system and method may be implemented.

Figure 10:
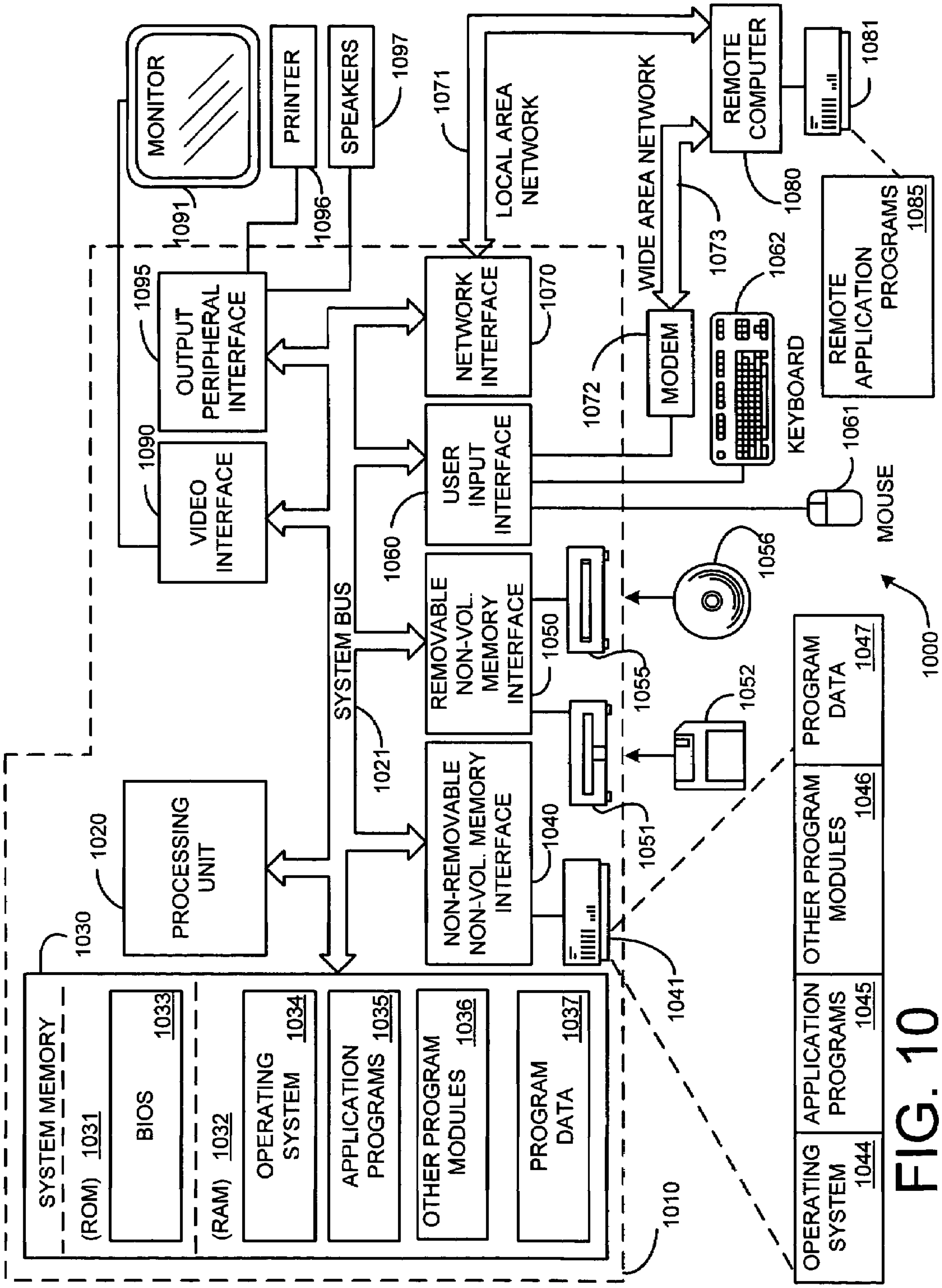
FIG. 10 illustrates an example of a suitable computing system environment in which the VSP system and method shown in FIGS. 1-9 may be implemented.

FIG. 10 illustrates an example of a suitable computing system environment in which the VSP system and method shown in FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The VSP system and method is operational with numerous other general purpose or special purpose computing system environments or configurations. Examples of well known computing systems, environments, and/or configurations that may be suitable for use with the VSP system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The VSP system and method may be described in the general context of computer-executable instructions, such as program modules, being executed by a computer. Generally, program modules include routines, programs, objects, components, data structures, etc., that perform particular tasks or implement particular abstract data types. The VSP system and method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for implementing the VSP system and method includes a general-purpose computing device in the form of a computer 1010. The computer 1010 is one example of the processing device 120 shown in FIG. 1.

Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the computer 1010 through input devices such as a keyboard 1062 and pointing device 1061, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing description of the invention has been presented for the purposes of illustration and description. It is not intended to be exhaustive or to limit the invention to the precise form disclosed. Many modifications and variations are possible in light of the above teaching. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the appended claims.

What is claimed is:

1. A computer-implemented method for varying a playback speed of a digital audio signal having an original playback speed, comprising:

using a computer to select input frames from the digital audio signal;

adjusting frame positions of the selected input frames using an enhanced correlation technique, the enhanced correlation technique further comprising applying a weighting function to local maxima of a correlation function to obtain a correlation score for each of the local maxima and using the correlation scores to adjust the frame positions; and overlapping and adding the adjust input frames to generate an output audio signal having a playback speed different from the original playback speed, wherein four input frames are used to generate one output frame of the output audio signal.

2. The computer-implemented method of claim 1, further comprising overlapping and adding three or more input frames to generate the output signal.

3. The computer-implemented method of claim 1, wherein the enhanced correlation technique further comprises:

determining overlapped regions of two input frames;

defining a correlation function between an end of the output audio signal and the input frames in the overlapped regions; and finding all local maxima of the correlation function.

4. The computer-implemented method of claim 3, further comprising designating a local maxima having a highest correlation score as a cut position.

5. The computer-implemented method of claim 4, further comprising defining the weighting function as a hat function such that local maxima near an offset position of the input frames are given greater weight corresponding to a higher correlation score.

6. The computer-implemented method of claim 1, further comprising estimating an offset location ($F_0$) of input frames in an input buffer using a beginning output buffer pointer $O_b$ and a speedup factor S.

7. The computer-implemented method of claim 6, using the following formula to estimate the offset location: $F_0=O_b\cdot S$.

8. The computer-implemented method of claim 7, further comprising centering a search window at the offset location in the input buffer.

9. The computer-implemented method of claim 1, wherein the digital audio signal has multiple channels, and further comprising:

averaging two of the multiple channels to generate an averaged input frame; and adjusting the frame positions of the averaged input frame using the enhanced correlation technique.

10. The computer-implemented method of claim 1, further comprising:

sub-sampling the digital audio signal successively by a factor of two until a sampling rate is below a predefined processor usage upper limit;

performing the enhanced correlation technique on the sub-sampled digital audio signal to determine a cut position; and performing the enhanced correlation technique on the original digital audio signal such that a search window is limited to a kernel of the sub-sampled digital audio signal.

11. A computer-readable storage medium having store and encoded thereon a computer program for performing the computer-implemented method recited in claim 1.

12. A computer-readable storage medium having stored and encoded thereon computer-executable instructions for altering an original playback speed of a digital audio signal, comprising:

an initialization step for:

designating a first frame length of the digital audio signal in an input buffer as a first frame;

writing a non-overlapping portion of the first frame to an output buffer;

moving an output buffer beginning pointer by an amount of the non-overlapping portion of the first frame;

a reception step for receiving the digital audio signal in an input buffer;

an estimation step for estimating an offset location in the input buffer of subsequent input frames;

a centering step for centering a search window at the offset location;

an adjustment step for performing a cross-correlation between an end of an output signal in an output buffer and each sample in overlapped regions in the search window of the input buffer to obtain a cut position, and the adjustment step further comprising;

determining each of the local maxima of the cross-correlation;

multiplying each of the local maxima by a weighting function to obtain a correlation score, such that local maxima closer to the offset location are given greater weight and a higher correlation score; and an overlap-add step for cuffing an input frame at the cut position of the input buffer and overlapping and adding the input frame to the end of the output signal to generate a digital audio signal having a playback speed different from the original playback speed such that three or more input frames are used to generate a single output frame of the output signal.

13. The computer-readable storage medium as set forth in claim 12, wherein the estimation step further comprises estimating the offset location using the formula:

$$F_0=O_b\cdot S,$$

where $F_0$ is the offset location, $O_b$ is the output buffer beginning pointer, and S is a speedup factor.

14. The computer-readable storage medium as set forth in claim 12, further comprising designating a local maximum having a highest correlation score as the cut position.

15. A variable speed playback system for varying a playback speed of a digital audio signal having an original playback speed, comprising:

an input buffer that receives the digital audio signal;

a frame selector that generates input frames from the digital audio signal in the input buffer;

an enhanced correlation module that adjusts input frames by finding local maxima of a correlation function using an enhanced correlation technique; and the enhanced correlation technique further comprising;

determining overlapped regions of two input frames;

defining a correlation function between an end of the output audio signal and the input frames in the overlapped regions;

finding all local maxima of the correlation function;

applying a weighting function to each of the local maxima to obtain a correlation score for each of the local maxima;

designating a local maxima having a highest correlation score as a cut position; and an overlap-add frame module that overlaps and adds the adjusted input frames to an end of an output signal.

16. The variable speed playback system of claim 15, wherein the overlap-add frame module uses at least three input frames to generate a single output frame of the output signal.

17. The variable speed playback system of claim 15, further comprising an output buffer containing an output signal having a same content as the digital audio signal but a playback speed that varies from the original playback speed, and wherein at least four input frames are used to generate a single output frame of the output signal.

18. The variable speed playback system of claim 17, further comprising a search window used by the frame selector to generate the input frames, wherein the search window is centered at an offset location in the input buffer.

* * * * *